Sept. 6, 1938.  W. H. BASELT  2,129,603
UNIT CYLINDER CLASP BRAKE
Filed Aug. 31, 1936  2 Sheets-Sheet 1

Inventor
Walter H. Baselt
by Orin D. B. Garner
Atty

Sept. 6, 1938.  W. H. BASELT  2,129,603

UNIT CYLINDER CLASP BRAKE

Filed Aug. 31, 1936  2 Sheets-Sheet 2

Inventor:
Walter H. Baselt,
By Orin O. B. Garner
atty.

Patented Sept. 6, 1938

2,129,603

UNITED STATES PATENT OFFICE 2,129,603

UNIT CYLINDER CLASP BRAKE

Walter H. Baselt, Chicago, Ill., assignor to American Steel Foundries, Chicago, Ill., a corporation of New Jersey Application August 31, 1936, Serial No. 98,720

30 Claims. (Cl. 188—56)

This invention relates to brake rigging for a railway car truck, and more particularly to such a rigging of the clasp type wherein brake heads and brake shoes are applied to opposite sides of each wheel.

An object of my invention is to provide a clasp brake arrangement which will be particularly suitable for high-speed trains and more particularly for trailer trucks of such trains.

Another object of my invention is to provide a clasp brake arrangement wherein the power means may be mounted in the transverse load carrying member of the truck, thus conserving all possible space.

A still further object of my invention is to provide a clasp brake rigging for a four wheel railway car truck wherein the rigging associated with the power means shall be located inwardly of the wheels leaving the end portions of the truck free and clear.

Still another object of my invention is to provide a clasp brake rigging of particularly efficient and simple form wherein independent power means shall control the rigging associated with each wheel and axle assembly.

With these and various other objects in view, the invention may consist of certain novel features of construction and operation as will be more fully described and particularly pointed out in the specification, drawings and claims appended hereto.

In the drawings which illustrate embodiments of the device and wherein like reference characters are used to designate like parts—

Figure 1:
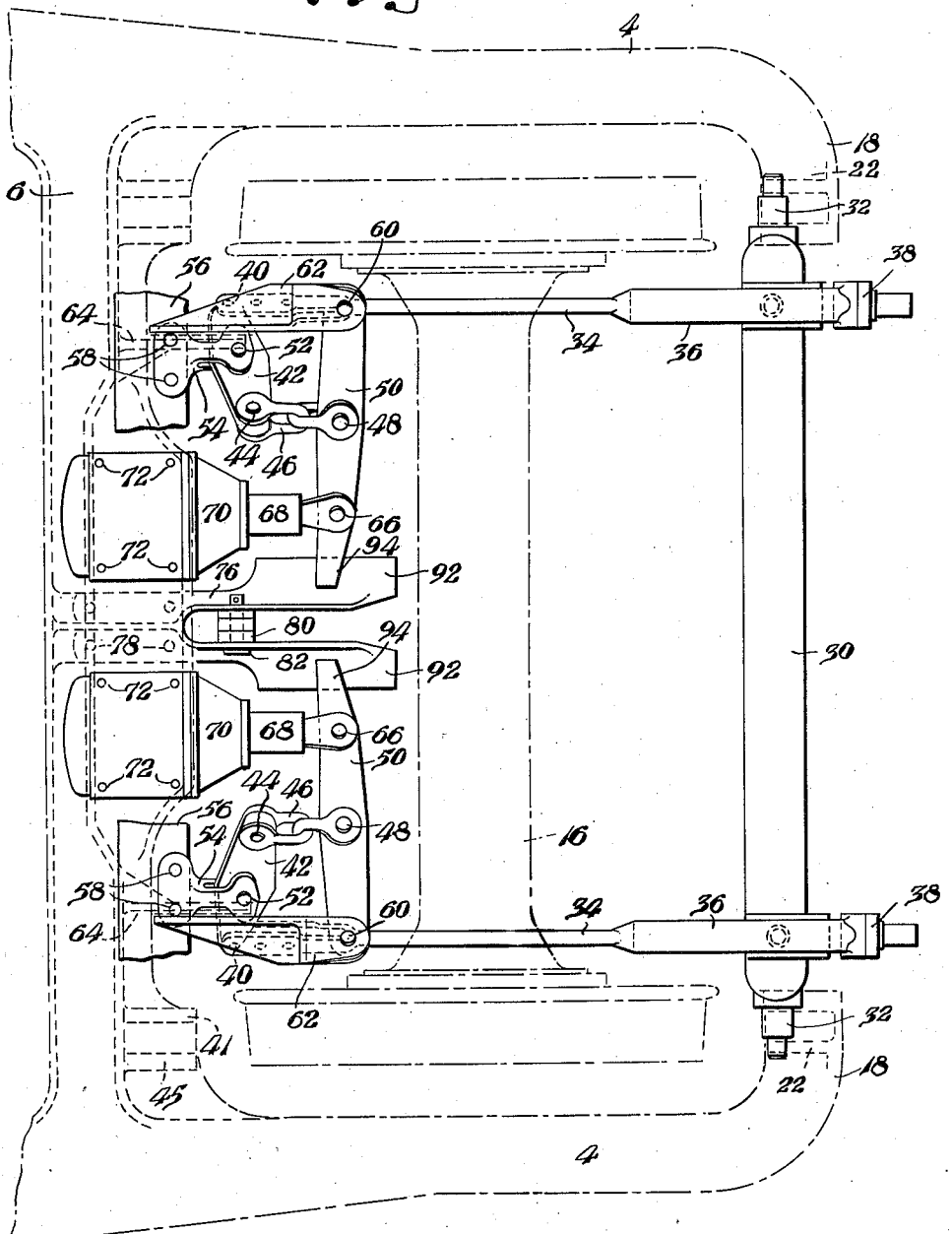
Figure 1 is a top plan view of one end of a car truck embodying my invention, only one end being shown since the construction is the same at both ends of the truck and such a showing is believed to be conducive to simplicity and understanding.

Describing the structure in more detail, 2 represents the car truck having side frames 4, 4 integrally joined by spaced transoms 6 between which may be carried the usual bolster (not shown) on which the car body may be supported in the well-known manner. Adjacent the ends of the side frames are the integrally formed pedestals 8 and 10 providing therebetween the jaw opening 12 within which may be received the journal portion 14 of the associated wheel and axle assembly 16. The ends of the side frames have the inwardly turned brackets 18 providing support for the brake rigging at the ends of the truck.

Figure 2:
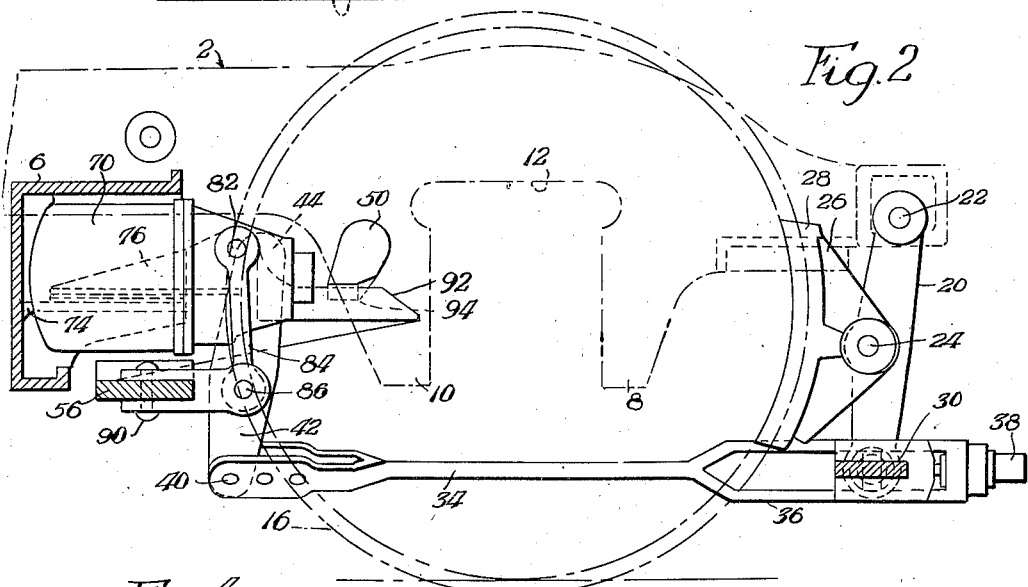
Figure 2 is a sectional view of the truck and brake structure shown in Figure 1, the section being taken substantially in the vertical plane bisecting the structure longitudinally.

The rigging comprises the hanger lever 20 (Figure 2, right) pivotally supported at its upper end as at 22 from the bracket 18 and pivotally supporting at a point intermediate its ends as at 24 the brake head 26 and the associated brake shoe 28 disposed for cooperation with the periphery of the adjacent wheel. The brake beam 30 has the trunnion end 32 which is pivotally connected to the lower end of the hanger lever 20 and adjacent the end of the beam 30 is connected a pull rod 34 having the slotted end 36, said connection being made adjustable by means of the manual slack adjuster 38. The opposite end of the pull rod 34 is pivotally and adjustably connected as at 40 to the lower end of the live truck lever 42, the upper end of said live truck lever being pivotally connected as at 44 to the clevis 46, the opposite end of said clevis being pivotally connected as at 48 to the cylinder lever 50 at a point intermediate the ends of said cylinder lever. The live truck lever 42 is pivotally connected at a point intermediate its ends as at 52 to the fulcrum 54 which is secured on the brake beam 56 at a point adjacent the end of said beam as by rivets 58—58.

Figure 4:
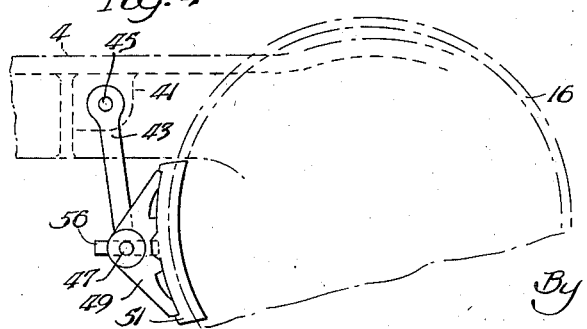
Figure 4 is a fragmentary side elevation of the truck structure shown in Figures 1 to 3 showing the manner of supporting the brake beams intermediate the wheels.

Adjacent the juncture of the transom 6 with the side frame 4 is provided the integral bracket 41 (Figure 4) as support means for the hanger 43, the upper end of said hanger being pivotally connected thereto as at 45. The lower end of the hanger 43 is pivotally connected as at 47 to the end of the brake beam 56. At the pivotal point 47 on the end of the beam 56 is mounted the brake head 49 and the associated brake shoe 51 for cooperation with the opposite side of the before mentioned wheel.

The outer end of the cylinder lever 50 is fulcrumed as at 60 from the bracket 62 which is secured to the bracket 64 (Fig. 3) integrally formed as a part of the transom 6 adjacent an end thereof. Adjacent its opposite end the cylinder lever 50 is pivotally connected as at 66 to the piston 68 of the power means or brake cylinder 70, said cylinder being mounted within said transom 6 and secured thereto as by means of the rivets 72—72.

Adjacent the longitudinal center line of the truck the transom 6 has the internal integrally formed shelf 74 to which is secured the bracket 76 by means of rivets 78—78, said bracket having the extended jaw portion 80 from which is pivotally hung as by means of the pin 82 the balance hanger 84. The lower end of the balance hanger 84 is pivotally connected as at 86 to the fulcrum 88, said fulcrum being secured to the middle point of the beam 56 as by rivet means 90, thus providing a support and balance for the brake beam.

Figure 3:
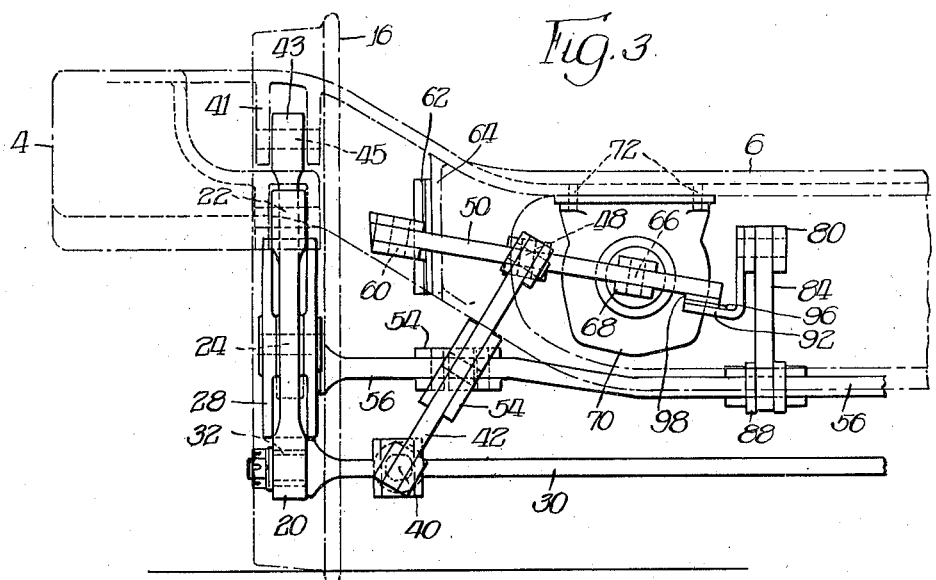
Figure 3 is an end elevation of the truck and brake structure shown in Figure 1, the view being taken from the right as seen in Figure 1.

The bracket 76 is extended longitudinally of the truck to form the shelf portion 92 which furnishes a sliding support for the inner end of the cylinder lever 50 as at 94, the upper surface of said bracket being provided with the wear plate 96 and the under surface of the cylinder lever 50 having the cooperating wear plate 98 (Figure 3).

The parts of the brake rigging at the side of the truck opposite that just described correspond in arrangement and function with those just described as most clearly shown in Figure 1, and the corresponding parts on the opposite side of the truck are identified by the same reference figures.

In operation, assuming the parts to be released, actuation of the dual power means 70, 70 causes the pistons 68, 68 to move to the right as viewed in Figure 1, thus rotating the cylinder levers 50, 50 around the fulcrums 60, 60 at their outer ends and through the clevis means 46, 46 causing rotation of the truck levers 42, 42 about the fulcrums 40, 40 at their lower ends until the brake shoes carried on the brake beam 56 are brought into engagement with the peripheries of the adjacent wheels at opposite sides of the truck. Continued actuation of the power means will cause the brake levers 42, 42 to rotate about the fulcrums 52, 52 intermediate their ends, thus moving to the left the pull rods 34, 34 with their interconnecting beam 30 until the brake shoes carried on the hangers 20 are brought into engagement with the opposite sides of the peripheries of the before mentioned wheels.

It will be understood of course that the brake structure at opposite ends of the truck and also at the opposite sides of each end are similar. Accordingly, two brake cylinders are mounted on each transom on opposite sides of the longitudinal center line of the truck and operate in unison to actuate the brake mechanism at one end of the truck.

Release of the power means will cause the brake rigging to move in a direction opposite to that described as occurring on actuation of the power means, thus allowing the brakes to assume their normal position wherein the shoes are spaced from the adjacent wheels.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a railway car truck the combination of a truck frame comprising a transverse load carrying member, wheel and axle assemblies, support means centrally formed on said load carrying member, power means mounted within said load carrying member adjacent the longitudinal center line of said truck, brake rigging comprising brake heads and brake beams disposed on opposite sides of each wheel and axle assembly, hanger levers supporting the beams outwardly of said wheels, hangers supporting the beams inwardly of said wheels, live truck levers pivotally connected at points intermediate their ends to the beams intermediate the wheels, pull rods adjustably connecting the lower ends of said live truck levers to the beams outwardly of said wheels, cylinder levers having their outer ends fulcrumed on said load carrying member and points intermediate their ends connected to the upper ends of said live truck levers, and operative connections between said power means and said cylinder levers.

2. In brake rigging for a railway car truck the combination of a truck frame comprising a transverse load carrying member, wheel and axle assemblies, a plurality of power means mounted within said load carrying member adjacent the longitudinal center line of said truck, hanger levers supporting said brake rigging outwardly of said wheels, brake beams connecting the lower ends of said hanger levers, brake heads and brake shoes pivotally secured on said hanger levers at points intermediate their ends, balance hangers supporting other brake beams intermediate the wheels, brake heads and brake shoes mounted on the ends of said other brake beams, live truck levers connected to said other beams at points intermediate their ends and having their lower ends adjustably connected to said first mentioned beams, and cylinder levers having their outer ends fulcrumed on said load carrying member, said cylinder levers being connected to said power means at points adjacent their inner ends and connected to said live truck levers at points intermediate their ends.

3. In a railway car truck the combination of a truck frame comprising a transverse load carrying member, a plurality of power means mounted therein adjacent the longitudinal center line of said truck, wheel and axle assemblies, hanger levers supporting brake beams, brake heads and brake shoes outwardly of said wheels, balance hangers supporting other brake beams intermediate said wheels, live truck levers having their lower ends adjustably connected to said first mentioned beams, brake beams intermediate the wheels connected to points intermediate the ends of said live truck levers, and cylinder levers having their outer ends fulcrumed on said load carrying member, said cylinder levers being pivotally connected adjacent their inner ends to said power means and having connections at points intermediate their ends to said live truck levers.

4. In a railway car truck the combination of a truck frame comprising a transverse load carrying member, power means secured therein adjacent the longitudinal center line of said truck, wheel and axle assemblies, support means mounted on said load carrying member between said power means, and brake rigging comprising brake beams supported at opposite sides of each wheel and axle assembly, hanger levers supporting brake heads and brake shoes intermediate their ends and connected at their lower ends to the beams outwardly of the wheels, live truck levers connected to the beams intermediate the wheels and having their lower ends connected to the beams outwardly of the wheels, balance hangers supporting the beams intermediate the wheels, cylinder levers having their inner ends slidably supported on said support means, said cylinder levers having their outer ends fulcrumed from said load carrying member and being connected adjacent their inner ends to said power means, and operative connections between said cylinder levers and said live truck levers.

5. In brake rigging for a railway car truck the combination of a truck frame comprising a load carrying member, wheel and axle assemblies, power means mounted in said load carrying member adjacent the longitudinal center line thereof, brake beams supported on opposite sides of each wheel and axle assembly, hanger levers supporting the beams outwardly of the wheels, balance hangers supporting the beams intermediate the wheels, live truck levers intermediate the wheels, said live truck levers having their lower ends connected to said beams outwardly of the wheels and points intermediate their ends connected to the beams between the wheels, and cylinder levers having their outer ends fulcrumed on said load carrying members, points intermediate their ends connected to said live truck levers and points adjacent their inner ends connected to said power means.

6. In brake rigging for a railway car truck the combination of a truck frame comprising a load carrying member, wheel and axle assemblies, power means mounted in said load carrying member adjacent the longitudinal center line thereof, brake beams supported on opposite sides of each wheel and axle assembly, hanger levers supporting the beams outwardly of the wheels, balance hangers supporting the beams intermediate the wheels, live truck levers intermediate the wheels, said live truck levers having their lower ends connected to said beams outwardly of the wheels and points intermediate their ends connected to the beams between the wheels, cylinder levers having their outer ends fulcrumed on said load carrying member, points intermediate their ends connected to said live truck levers and points adjacent their inner ends connected to said power means, and support means mounted on said load carrying member, the inner ends of said cylinder levers being slidably supported on said support means.

7. In a brake rigging for a railway car truck the combination of a truck frame comprising a transverse load carrying member, a plurality of power means mounted therein on opposite sides of the longitudinal center line of said truck, wheel and axle assemblies, brake beams supported on opposite sides of each wheel and axle assembly, hanger levers supporting the beams outwardly of the wheels, brake heads and brake shoes mounted on said hanger levers at points intermediate their ends, live truck levers pivotally connected to the beams intermediate the wheels, pull rods connecting the lower ends of said live truck levers to the beams outwardly of the wheels, cylinder levers connected at points adjacent their inner ends to said power means and having their outer ends fulcrumed from said load carrying means, and operative connections between said cylinder levers and said live truck levers.

8. In a brake rigging for a railway car truck the combination of a truck frame comprising a transverse load carrying member, a plurality of power means mounted therein on opposite sides of the longitudinal center line of said truck, wheel and axle assemblies, brake beams supported on opposite sides of each wheel and axle assembly, hanger levers supporting the beams outwardly of the wheels, brake heads and brake shoes mounted on said hanger levers at points intermediate their ends, live truck levers pivotally connected to the beams intermediate the wheels, pull rods connecting the lower ends of said live truck levers to the beams outwardly of the wheels, cylinder levers connected at points adjacent their inner ends to said power means and having their outer ends fulcrumed from said load carrying member, operative connections between said cylinder levers and said live truck levers, and support means mounted on said load carrying member, said cylinder levers having their inner ends slidably supported on said support means.

9. In a railway car truck the combination of a truck frame comprising a trnasverse load carrying member, wheels and axles, fulcrum means secured to said load carrying member adjacent the ends thereof, dual power means secured to said load carrying member adjacent the longitudinal center line of said truck, support means on said load carrying member between said power means, and cylinder levers having their inner ends slidably supported on said support means and their outer ends secured to said fulcrum means, said cylinder levers having operative connections at points intermediate their ends respectively to said power means and to brake rigging for cooperation with opposite sides of each of said wheels.

10. In a railway car truck the combination of a truck frame comprising a transverse load carrying member, wheels and axles, fulcrum means secured to said load carrying member adjacent the ends thereof, dual power means secured to said load carrying member adjacent the longitudinal center line of said truck, support means on said load carrying member between said power means, cylinder levers having their inner ends slidably supported on said support means and their outer ends secured to said fulcrum means, said cylinder levers having operative connections at points intermediate their ends respectively to said power means and to brake rigging for cooperation with opposite sides of each of said wheels, said brake rigging comprising hanger levers supporting brake beams outwardly of said wheels, balance hangers supporting brake beams intermediate the wheels, live truck levers connected at points intermediate their ends to the beams between the wheels and operatively connected to the beams outwardly of the wheels, and an operative connection between said live truck levers and said cylinder levers.

11. In a brake rigging for a railway car truck the combination of a truck frame including a transverse load carrying member having fulcrum means adjacent the ends thereof, wheel and axle assemblies, brake cylinders supported in said member adjacent the longitudinal center line of said truck, support means on said member between said cylinders, hanger levers supporting brake heads and brake beams outwardly of the wheels, balance hangers hung from said support means and supporting brake beams intermediate the wheels, live truck levers pivoted from said last mentioned beams at points intermediate the ends of said levers and having their lower ends operatively connected to said first mentioned beams, and cylinder levers connected adjacent their inner ends to said cylinders and having their inner ends supported on said support means, said cylinder levers having their outer ends connected respectively to said fulcrum means and being connected respectively to said live truck levers.

12. In a brake rigging for a railway car truck the combination of a truck frame including a transverse load carrying member having fulcrum means adjacent the ends thereof, wheel and axle assemblies, brake cylinders supported in said member adjacent the longitudinal center line of said truck, support means on said member between said cylinders, hanger levers supporting brake heads and brake beams outwardly of the wheels, balance hangers hung from said support means and supporting brake beams intermediate the wheels, live truck levers pivoted from said last mentioned beams at points intermediate the ends of said levers and having their lower ends operatively connected to said first mentioned beams, cylinder levers fulcrumed at their outer ends on said fulcrum means and connected adjacent their inner ends to said cylinders, and connections between said live truck levers and said cylinders.

13. In a four wheel railway car truck the combination of a truck frame comprising a transverse load carrying member having fulcrum means adjacent the ends thereof, power means mounted in said member adjacent the longitudinal center line of said truck, hanger levers supporting brake heads and a brake beam outwardly of the wheels, a balance hanger supporting a beam between the wheels, live truck levers fulcrumed intermediate their ends from said last mentioned beam and adjustably connected at their lower ends to the first mentioned beam, and cylinder levers having their outer ends pivotally connected respectively to said fulcrum means and points intermedite their ends connected respectively to said live truck levers, said cylinder levers having connections adjacent their inner ends to said power means.

14. In a four wheel railway car truck the combination of a truck frame comprising a transverse load carrying member having fulcrum means adjacent the ends thereof, power means mounted in said member adjacent the longitudinal center line of said truck, hanger levers supporting brake heads and a brake beam outwardly of the wheels, a balance hanger supporting a beam between the wheels, live truck levers fulcrumed intermediate their ends from said last mentioned beam and adjustably connected at their lower ends to the first mentioned beam, cylinder levers having their outer ends pivotally connected respectively to said fulcrum means and points intermediate their ends connected respectively to said live truck levers, said cylinder levers being connected adjacent their inner ends to said power means, and a bracket on said member providing sliding support for the inner ends of said cylinder levers.

15. In a four wheel railway car truck the combination of a truck frame comprising a transverse load carrying member having fulcrum means adjacent the ends thereof, power means mounted in said member adjacent the longitudinal center line of said truck, hanger levers supporting brake heads and a brake beam outwardly of the wheels, a balance hanger supported from said member intermediate said power means and supporting a brake beam intermediate the wheels, live truck levers fulcrumed intermediate their ends from said last mentioned beam and adjustably connected at their lower ends to the first mentioned beam, and cylinder levers having their outer ends pivotally connected respectively to said fulcrum means, points intermediate their ends connected respectively to said live truck levers, and connected respectively adjacent their inner ends to said power means.

16. In a four wheel railway car truck the combination of a truck frame comprising a transverse load carrying member having fulcrum means adjacent the ends thereof, power means mounted in said member adjacent the longitudinal center line of said truck, hanger levers supporting brake heads and a brake beam outwardly of the wheels, a balance hanger supported from said member intermediate said power means and supporting a brake beam intermediate the wheels, live truck levers fulcrumed intermediate their ends from said last mentioned beam and adjustably connected at their lower ends to the first mentioned beam, cylinder levers having their outer ends pivotally connected respectively to said fulcrum means and points intermediate their ends connected respectively to said live truck levers, said cylinder levers having connections adjacent their inner ends to said respective power means, and a bracket secured to said member and providing sliding support for the inner ends of said cylinder levers.

17. In a railway car truck the combination of a truck frame comprising side members and transverse load carrying members, wheel and axle assemblies, power means mounted respectively in said load carrying members for operation of the brake rigging at opposite ends of the truck, said brake rigging comprising hanger levers hung from said side members and supporting brake heads and brake beams outwardly of the wheels, balance hangers supporting brake beams intermediate the wheels, live truck levers having their lower ends operatively connected to said first mentioned beams and points intermediate their ends fulcrumed from said last mentioned beams, cylinder levers having their outer ends fulcrumed from said load carrying members and their inner ends connected to said power means, and operative connections between said cylinder levers and said live truck levers.

18. In a railway car truck the combination of a truck frame comprising side members and transverse load carrying members, wheel and axle assemblies, power means mounted respectively in said load carrying members for operation of the brake rigging at opposite ends of the truck, brackets secured to said load carrying members between said power means, said brake rigging comprising hanger levers hung from said side members and supporting brake heads and brake beams outwardly of the wheels, balance hangers hung from said brackets and supporting brake beams intermediate the wheels, live truck levers having their lower ends operatively connected to said first mentioned beams and points intermediate their ends fulcrumed from said last mentioned beams, cylinder levers having their outer ends fulcrumed from said load carrying members and their inner ends connected to said power means, and operative connections between said cylinder levers and said live truck levers.

19. In a railway car truck the combination of a truck frame comprising side members and transverse load carrying members, wheel and axle assemblies, power means mounted respectively in said load carrying members for operation of the brake rigging at opposite ends of the truck, brackets secured to said load carrying members between said power means, said brake rigging comprising hanger levers hung from said side members and supporting brake heads and brake beams outwardly of the wheels, balance hangers hung from said brackets and supporting brake beams intermediate the wheels, live truck levers having their lower ends operatively connected to said first mentioned beams and points intermediate their ends fulcrumed from said last mentioned beams, cylinder levers having their outer ends fulcrumed from said load carrying members and their inner ends connected to said power means, and operative connections between said cylinder levers and said live truck levers, said cylinder levers having their inner ends slidably supported on said brackets.

20. In a brake rigging for a four wheel railway car truck the combination of a truck frame comprising side members and transverse load carrying members, a plurality of power means mounted in each of said transverse members for operation of brake rigging at opposite ends of said truck respectively, said rigging comprising cylinder levers having their inner ends slidably supported from said transverse members and their outer ends fulcrumed from said transverse members, and live truck levers having their upper ends connected to points intermediate the ends of said cylinder levers, said live truck levers being fulcrumed at points intermediate their ends from brake beams supported intermediate the wheels and having their lower ends operatively connected to brake beams supported outwardly of the wheels.

21. In combination a truck frame comprising a transverse member, a wheel and axle assembly, and brake rigging including brake beams supported at opposite sides of said assembly, dual power means supported on said transverse member, cylinder levers having their outer ends fulcrumed from said transverse member, points adjacent their inner ends connected respectively to said power means, and operative connections between points intermediate the ends of said cylinder lever and said brake beams, said connections comprising live truck levers fulcrumed intermediate their ends at points adjacent the ends of one of said beams and connected at their lower ends to the other of said beams through the medium of pull rods.

22. In brake rigging for a railway car truck, a truck frame with a transverse load carrying member, spaced power means and spaced fulcrum means on said load carrying member, a wheel and axle assembly, a brake rigging comprising beams supported at opposite sides of said assembly, cylinder levers connected adjacent their inner ends to said power means and at their outer ends respectively to said fulcrums, and spaced live truck levers connected intermediate their ends to points adjacent opposite ends of one of said beams, said truck levers being connected at their upper ends respectively to points intermediate the ends of said cylinder levers and operatively connected at their lower ends rspectively to points adjacent opposite ends of the other of said beams.

23. In combination, a railway truck having a frame with a transverse member, a wheel and axle assembly, brake rigging including brake beams supported at opposite sides of said assembly, dual power means supported on said transverse member, cylinder levers having their outer ends fulcrumed from said transverse member and points adjacent their inner ends connected respectively to said power means, live truck levers having their upper ends connected respectively to points intermediate the ends of said cylinder lever, points intermediate their ends operatively connected to spaced points on one of said beams, and pull rods connecting the lower ends of said truck levers to the other of said beams.

24. In railway brake rigging, a car truck having a transverse member, a wheel and axle assembly, braking means disposed for cooperation with the wheels of said assembly, duel power means mounted on said transverse member on opposite sides of the longitudinal center line of the truck, supporting means on said transverse member between said power means, and cylinder levers operatively connected respectively to said power means and having their ends carried by said support means, said cylinder levers having their outer ends fulcrumed adjacent the opposite ends of said transverse member and points intermediate their ends operatively connected to said braking means.

25. In combination a railway truck having a frame with a transverse load carrying member, a wheel and axle assembly, spaced power means and spaced fulcrums mounted on said load carrying member, support means intermediate said power means, and spaced cylinder levers having their inner ends carried by said support means, points adjacent their inner ends connected respectively to said power means, said cylinder levers having their outer ends connected respectively to said fulcrum means and points intermediate their ends operatively connected to brake rigging associated with said wheel and axle assembly.

26. In a railway car truck, the combination of a frame including a transverse member, a wheel and axle assembly, braking means cooperating with opposite sides of the wheels of said assembly, a plurality of power means supported on said transverse member adjacent the longitudinal center line thereof, fulcrum means formed on said transverse member adjacent the opposite ends thereof, and cylinder levers having their outer ends secured to said fulcrum means, points adjacent their inner ends connected to said cylinders and points intermediate their ends operatively connected to said braking means.

27. In combination, a railway car truck having a frame with a transverse load carrying member, a wheel and axle assembly, brake rigging comprising a brake beam, spaced power means and spaced fulcrums on said load carrying member, cylinder levers connected adjacent their inner ends to said power means and at their outer ends respectively to said fulcrums, and operative connections at points intermediate the ends of said levers respectively and spaced points on said brake beam.

28. In combination a truck frame comprising a transverse member, a wheel and axle assembly, and brake rigging including brake beams supported at opposite sides of said assembly, dual power means supported on said transverse member, cylinder levers having their outer ends fulcrumed from said transverse member and points adjacent their inner ends connected respectively to said power means, and operative connections between points intermediate the ends of said cylinder levers and said brake beams.

29. In brake rigging for a railway car truck, a truck frame, wheels and axles in supporting relation thereto, dual power means on said truck frame adjacent the longitudinal center line thereof, a brake beam, and cylinder levers connected adjacent their inner ends respectively to said power means and at their outer ends adjacent opposite sides of said frame, and operative connections intermediate the ends of said levers respectively and spaced points on said brake beam.

30. In brake rigging, the combination of a truck frame having a transverse member, a wheel and axle, braking means supported for engagement at opposite sides of said wheel, power means supported on said transverse member, and a cylinder lever having its outer end fulcrumed from said transverse member, a point adjacent its inner end connected to said power means and a point intermediate its ends operatively connected to both of said braking means.

WALTER H. BASELT.